Aug. 25, 1970     A. D. JOHNSTON     3,525,558

INDENTS FOR ROLLERS

Filed Sept. 30, 1968

INVENTOR.
Albert D. Johnston
BY

F. J. Fasale
ATTORNEY

United States Patent Office 3,525,558
Patented Aug. 25, 1970

3,525,558
INDENTS FOR ROLLERS
Albert D. Johnston, St. Charles, Ill., assignor to General Motors Corporation, Detroit, Mich., a corporation of Delaware
Filed Sept. 30, 1968, Ser. No. 763,651
Int. Cl. F16c 1/24
U.S. Cl. 308—187
2 Claims

ABSTRACT OF THE DISCLOSURE

A roller bearing having a radial thrust shoulder is provided with a complement of rollers with end faces designed to improve the flow of lubricant to the interface between the end faces and the thrust shoulder. Each end face includes a central indentation and continuous radial channels to take advantage of the centrifugal force generated by the roller rotating about its own axis to flow the lubricant into the interface.

---

My invention relates generally to roller bearings and more specifically to roller bearings that sustain a relatively heavy thrust load in one direction through the roller end faces to a radial shoulder on one bearing race.

It is generally old to sustain a thrust load in a roller bearing in addition to a radial load by transmitting the thrust load through the roller end faces to a radial thrust shoulder on one of the races. However, since the rollers are rolling on the bearing pathway, there is relative movement or a skidding action occurs between a roller end face and the thrust shoulder. This relative movement increases from a zero relative velocity at the pathway to a maximum at the end of the shoulder. The skidding generates friction which is a function of the thrust load and which in turn causes roller end face wear and/or wear on the shoulder. The wear is generally counteracted by the presence of a lubricant between the roller end face and the thrust shoulder to prevent metal-to-metal contact and reduce friction. The problem which exists in presently designed bearings of this general type is to provide a sufficient supply of lubricant to this inner face between the roller end face and the thrust shoulder. Accordingly, stated in its broadest terms, it is the object of my invention to provide a roller bearing in which a thrust load is transmitted between at least one end face of the rollers and a thrust shoulder on one of the races wherein the flow of lubricant to the inner face between the roller end thrust face and the thrust shoulder is improved.

Another object of my invention is to provide such a bearing which will supply sufficient lubricant to the interface to maintain a hydrodynamic film therein to reduce wear and improve bearing life.

While my invention is not so limited, it is especially adaptable to a taper roller bearing used in an automobile rear wheel wherein the bearing is housed in a chamber at least partially filled with a lubricant and wherein the bearing is subjected to rather heavy thrust loads in one direction. In such a taper roller bearing, the heavy thrust is transmitted from the outer race in a normal direction to the roller surface from where the greater portion of the thrust load is transferred to the inner race through the roller end face via the thrust shoulder at the large diameter end of the inner race. Accordingly, it is another object of my invention to provide a taper roller bearing for use in a lubricant-filled chamber wherein the flow of lubricant to the inner face between the roller end face and the thrust shoulder on the large diameter end of the inner race is improved.

With these and other objects in views, as will hereinafter more fully appear, and which will be more particularly pointed out in the appended claims, reference is now made to the following description taken in connection with the accompanying drawings in which:

Figure 1:
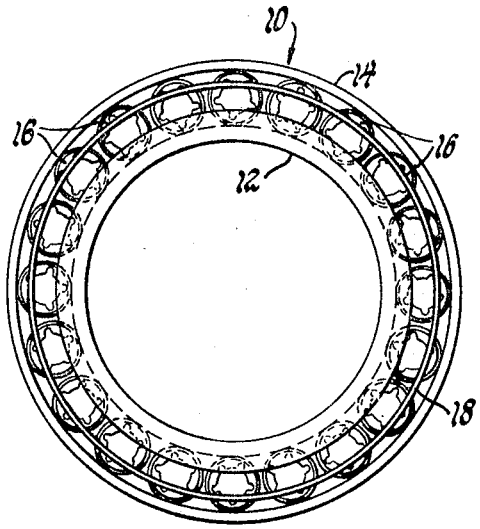
FIG. 1 is a frontal view from the large diameter end of a taper roller bearing in accordance with my invention.
Figure 3:
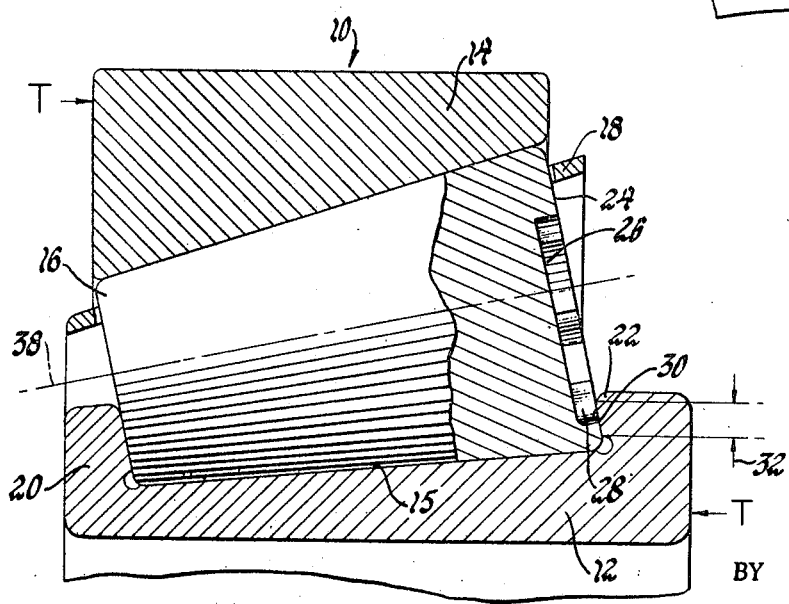
FIG. 3 is a section taken along the line 3—3 of FIG. 2 and looking in the direction of the arrows.

Referring now to the drawings and more specifically to FIG. 1, the taper roller bearing indicated generally at 10 includes an inner race 12 and an outer race 14 with a complement of rollers 16 circumferentially spaced by a separator 18 therebetween. As can be seen from FIG. 3, the taper roller bearing of the outer race 14 is merely an annulus of frustoconical cross section and has no shoulders. The inner race 12, however, with its taper pathway 15 has a thrust shoulder 20 at its small diameter end and a thrust shoulder 22 at its large diameter end. The separator 18, a sheet metal cylinder with punched pockets is located outwardly of the bearing pitch circle 38 and retains the rollers 16 against the pathway 14. The inner race 12, rollers 16, and separator 18 are assembled into unit-handled relationship by the well-known "bump" method which is clearly described in the U.S. patent to Buckwalter 1,444,326.

Figure 2:
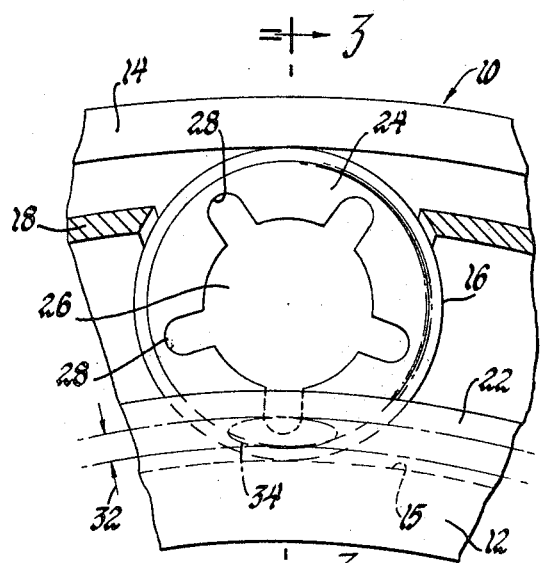
FIG. 2 is an enlargement of a portion of FIG. 1 showing a single taper roller and its relationship to the races of the bearing shown in FIG. 1.

Zeroing in on the improvement of this invention, the end face 24 has a central indentation 26 with a plurality of continuous radial channels 28 as best seen in FIG. 2.

Returning momentarily to FIG. 3, the end face 24 of the rollers 16 is crowned in the conventional manner. The radial shoulder 22 is likewise conventionally crowned at its O.D. and undercut at its I.D. where it meets the pathway 15. Thus the actual thrust face 30 which receives a load from the roller end face 24 is limited to an annular area having a radial dimension indicated at 32 less than the radial height of the shoulder 22 which is determined by the dimensions of the undercut, the shoulder and roller crowns.

Returning to FIG. 2, the actual area available for transfer of thrust from the roller end face to the thrust face 30 at any given instant is somewhat elliptical and indicated at 34. It is to be noted that the central depression 26 preferably does not enter the contact area 34 and that preferably the radial channels 28 are circumferentially spaced so that only a single channel is in the contact area at any given time. This dimensioning of the central indentation 26 and the radial channels 28 provides a sufficient amount of area through which to transfer the thrust load from the roller end face 24 to the thrust shoulder 22. While the entire thrust load is not transferred in this manner since the pathway 15 is tapered and will absorb some of the thrust load, a major portion of the thrust load is so transferred. The rollers 16 rotate about their own axis 38 in the pitch circle as they orbit in the pitch circle about the bearing center. This rotation about its own center produces a centrifugal force which acts on lubricant in the central indentation 26 and causes it to flow radially outwardly from the roller center through the radial channels 28. As each channel 28 enters the area of the thrust shoulder 22, the lubricant in the channel flows into the film between the bearing end face and the thrust face on the shoulder 22 thereby assuring a sufficient amount of lubricant which in turn decreases bearing face end wear and increases bearing life. The channels are preferably designed in accordance with the thrust load and bearing speed so as to be able to maintain not only a sufficient amount of lubricant but a film of lubricant of sufficient thickness to produce a hydrodynamic effect to further decrease friction and wear.

While I have specifically disclosed a taper roller bearing, it is to be understood that my invention is also applicable to roller bearings of any type in which thrust is transferred from the roller end face to the thrust shoulder on one of the bearing races.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

I claim:

1. In a roller bearing having a race with a pathway and a radially extending thrust shoulder, a complement of rollers rollably engaging said pathway and having end faces spaced closely adjacent said thrust shoulder in an area of contact with a hydrodynamic layer of lubricant therebetween, each of said end faces having a central indentation out of said area of contact, and a plurality of radial channels in each of said end faces continuous with said central indentation, said radial channels being circumferentially spaced so that only one of said channels is in said area of contact at any given instant whereby centrifugal force increases the flow of lubricant to the film between said end faces and said thrust shoulder to reduce wear and improve bearing life.

2. In a roller bearing as defined in claim 1 wherein said roller bearing is a tapered roller bearing and wherein said thrust shoulder is at the large diameter end of said inner race.

References Cited

UNITED STATES PATENTS

| | | | |
|---|---|---|---|
| 2,499,640 | 3/1950 | Gamet | 308—187 |
| 1,727,576 | 9/1929 | Umstalled | 308—214 |

MARTIN P. SCHWADRON, Primary Examiner

F. SUSKO, Assistant Examiner